United States Patent [19]

Matsumoto et al.

[11] Patent Number: 5,375,637
[45] Date of Patent: Dec. 27, 1994

[54] PORTABLE ELECTRIC ROUTER

[75] Inventors: Kihachiro Matsumoto; Akira Onose, both of Katsuta, Japan

[73] Assignee: Hitachi Koki Co., Ltd., Tokyo, Japan

[21] Appl. No.: 179,222

[22] Filed: Jan. 10, 1994

[30] Foreign Application Priority Data

Jan. 22, 1993 [JP] Japan .................. 5-009217

[51] Int. Cl.⁵ .................................. B27C 5/10
[52] U.S. Cl. ..................... 144/136 C; 144/134 R; 310/63; 310/74; 318/161; 409/182
[58] Field of Search ............ 83/99, 100; 30/124; 318/161; 310/62, 63, 24, 153; 409/135, 182

[56] References Cited

U.S. PATENT DOCUMENTS

| | | | |
|---|---|---|---|
| 2,931,928 | 4/1960 | Fehn, Sr. ................. | 318/161 |
| 3,811,361 | 5/1974 | Seely et al. .............. | 409/182 |
| 4,051,880 | 10/1977 | Hestily .................... | 409/182 |
| 4,360,751 | 11/1982 | Arnold, Jr. et al. ..... | 310/63 |
| 4,459,087 | 7/1984 | Barge ...................... | 310/63 |
| 4,716,648 | 1/1988 | Nel .......................... | 310/62 |
| 4,757,221 | 7/1988 | Kurihashi et al. ....... | 310/63 |
| 4,836,755 | 6/1989 | Nitsche et al. ........... | 310/74 |
| 5,073,736 | 12/1991 | Gschwender et al. ... | 310/63 |
| 5,241,230 | 8/1993 | Tanaka et al. ........... | 310/62 |

*Primary Examiner*—W. Donald Bray
*Attorney, Agent, or Firm*—Sughrue, Mion, Zinn, Macpeak & Seas

[57] ABSTRACT

A compact, and lightweight portable electric router providing sufficient cutting efficiency. The router includes rotary components such as an armature of a drive motor, a motor shaft, a cooling fan connected to the motor shaft and a chuck for fixing thereto a cutting bit. An outer peripheral portion of the cooling fan is provided with a weight or a flywheel member to increase resultant inertial moment of the rotary component, to thus increase rotating power of the cutting bit.

12 Claims, 5 Drawing Sheets

PORTABLE ELECTRIC ROUTER

BACKGROUND OF THE INVENTION

The present invention relates to a portable electric router, and more particularly, to the portable electric router capable of performing chamfering and groove forming operations with the employment of a rotary cutting bit.

FIGS. 1 and 2 show an example of a conventional portable electric router. As is well known in the art, a housing 12 is movably supported on a base 11 which guides the router when sliding over a workpiece such as wood material 20. A motor housed in the housing 12 has a motor shaft 2, whose lower end is provided with a chuck 5 for mounting a cutting bit 6 which may take on various forms. The bit 6 is rotated by rotation of the motor and can therefore be used for beveling or chamfering work and groove forming work.

As best shown in FIG. 2, the motor includes a stator 7 having a stator coil and a stator core, and an armature 1 having an armature coil and an armature core. A cooling fan 3 is mounted to the lower portion of the armature shaft, i.e., the motor shaft 2. The cutting bit 6 is mounted onto the lower end of the armature shaft 2 by the chuck 5.

A portable electric router constructed as described above is a tool for performing chamfering or grooving work on a workpiece made of, for example, wood. This is an especially indispensable tool for producing furniture. This type of tool must be highly efficient at cutting, must be lightweight, and easy to maneuver, and capable of producing good finished surfaces. Of these basic capabilities, if the finishing level is sufficient to make a product, normally cutting efficiency is most demanded for improving production.

Generally, increasing the lamination thickness of the motor is used as a means to enhance the cutting efficiency, which leads to enlargement of the motor size and increase in its rotation power. However, enlarging the size of the motor increases the overall weight of the router. The core and coil of the stator and the armature increases and so does the cost of production. Resultant electric router does not provide sufficient transportability and operability or workability, those being other requisite factors.

In another aspect, the cutting bit normally has two cutting edge portions. In operating the router which assembles such cutting bit, load variation will occur. The fluctuation of load may degrade operability of the router and quality in the finished product.

SUMMARY OF THE INVENTION

It is, therefore, an object of the present invention to overcome the above-described drawbacks, and to provide a compact, lightweight, portable electric router with improved cutting efficiency without increasing the size of the motor.

Another object of the present invention is to provide such an electric router capable of performing sufficient operability and transportability.

These and other objects of the present invention will be attained by providing a portable electric router for forming a chamfered portion or a groove portion in a workpiece, the router including a drive motor having a stator, an armature and a motor shaft, a cooling fan provided to the motor shaft and rotatable together with the motor shaft, the cooling fan being provided with a plurality of fan blades, and a chuck engageable with the motor shaft for clamping a cutting bit. The cooling fan has a flywheel portion for increasing an inertial moment of the motor shaft. Accordingly, driving power to the cutting bit can be increased.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 3:
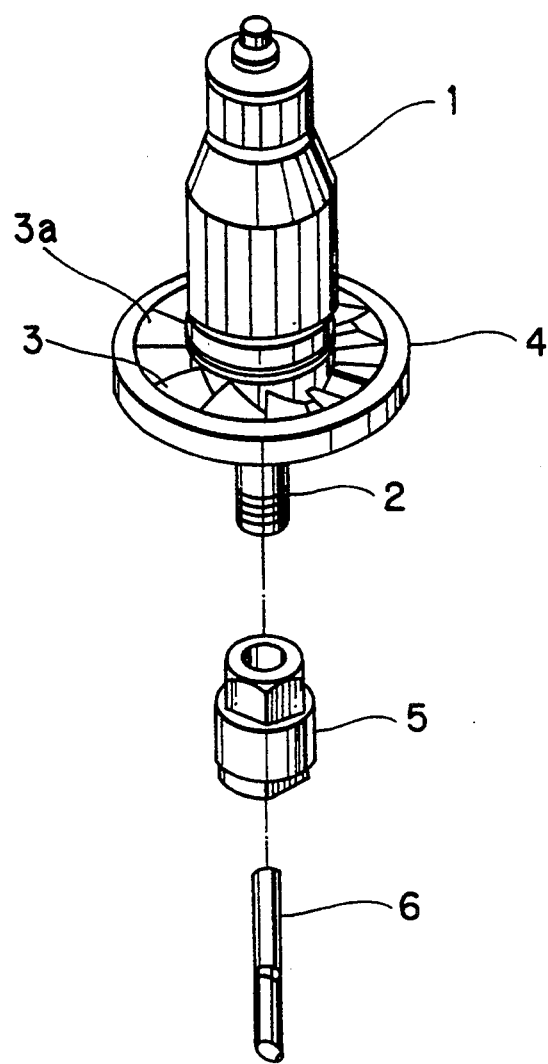
FIG. 3 is an exploded perspective view showing an essential portion of an electric router according to a first embodiment of the present invention.
Figure 4:
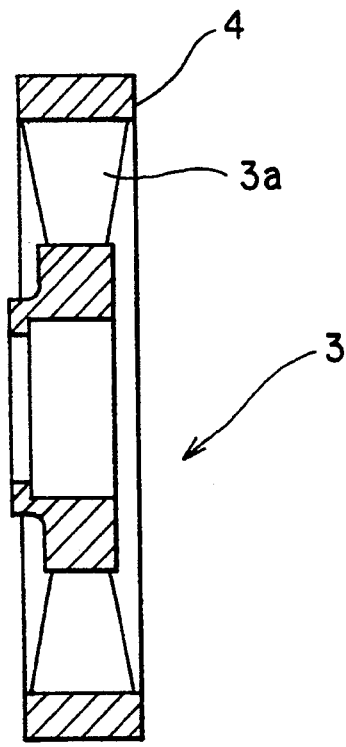
FIG. 4 is a cross-sectional view showing the cooling fan according to the first embodiment.

A portable electric router according to a first embodiment of the present invention will be described with reference to FIGS. 3 and 4 in which are shown a motor and rotatable components. An armature 1 constructed from an armature coil, an armature core, a commutator, etc., has an armature shaft 2, whose lower end portion is assembled with a cooling fan 3. The bottom tip of the armature shaft 2 has a thread portion threadingly engageable with a chuck 5. A cutting bit 6 is assembled to the chuck 5, so that the cutting bit 6 is rotatable about its axis together with the armature shaft 2.

The cooling fan 3 is of an axial-flow fan. That is, a housing of the fan confines the gas flow to the direction along the rotating shaft at both the inlet and the outlet. The cooling fan 3 is formed from material with a high specific gravity, such as aluminum. Outer edges of fan blades 3a are connected by an annular weight 4. The weight 4 is formed integratedly with, and from the same materials as, the fan blades 3a. The weight 4 is positioned away from the rotation center of the armature shaft 2 as much as possible. Therefore, inertial moment of the cooling fan 3 can be increased as much as possible. The weight 4 serves as a flywheel portion for increasing inertial moment of the colling fan 3.

Figure 5:
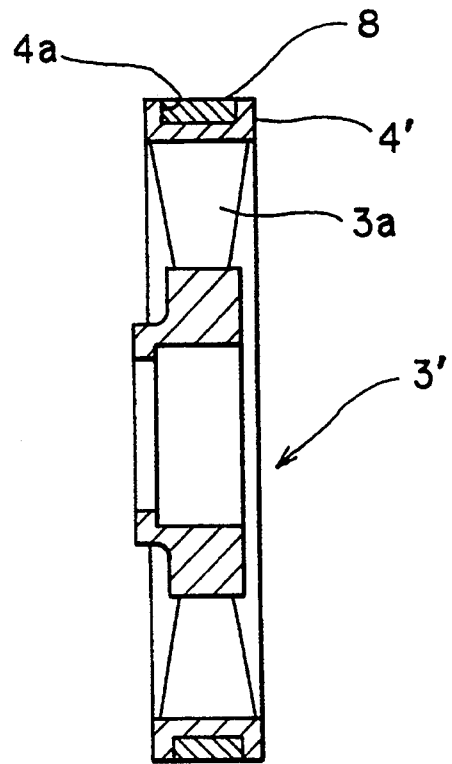
FIG. 5 is a cross-sectional view showing a cooling fan according to a modification to the first embodiment.

FIG. 5 shows a cooling fan 3' according to a modification to the fan 3 of the first embodiment. By comparing with FIG. 4, it can be seen that the cooling fan 3' of the modified embodiment has a shape similar to that of the cooling fan 3 in the first preferred embodiment. However, the cooling fan 3' of the modification is formed of a synthetic resin in order to provide the electric router with double insulation. The decrease in total weight can be made up for by providing an annular-shaped second weight 8, formed from a material, such as iron, with a high specific gravity. More specifically, the fan blade portion 3a and a annular weight 4' are integrally formed of the synthetic resin. An outer peripheral surface of the weight portion 4' is formed with an annular groove 4a with which the second weight 8 is fixedly fitted. The second weight 8 also serves as the flywheel portion for increasing inertial moment of the cooling fan 3'.

Figure 6:
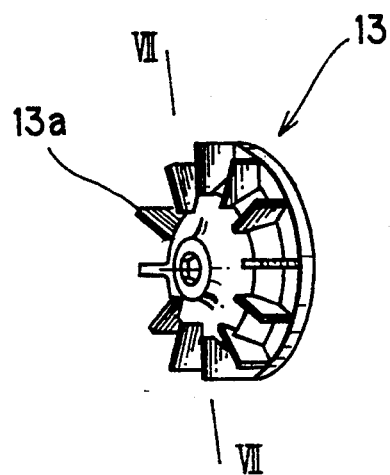
FIG. 6 is a perspective view showing a cooling fan according to a second embodiment of this invention.
Figure 7:
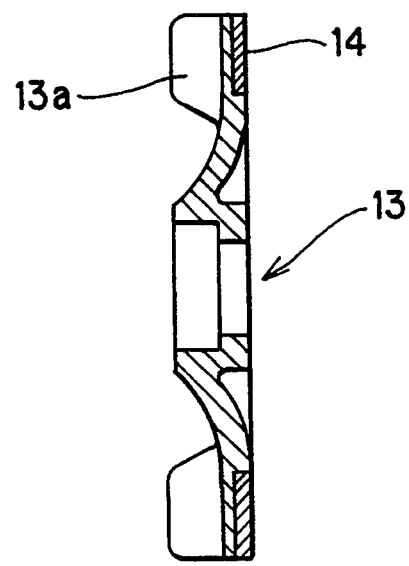
FIG. 7 is a cross-sectional view taken along a line VII—VII of FIG. 6.

FIGS. 6 and 7 show a cooling fan 13 of a router according to a second preferred embodiment of the present invention. In the second preferred embodiment, the cooling fan 13 is a radial-flow fan having radially extending fan blades 13a. An annular disc shape weight 14 is provided in the outer peripheral portion of the fan body.

Figure 8:
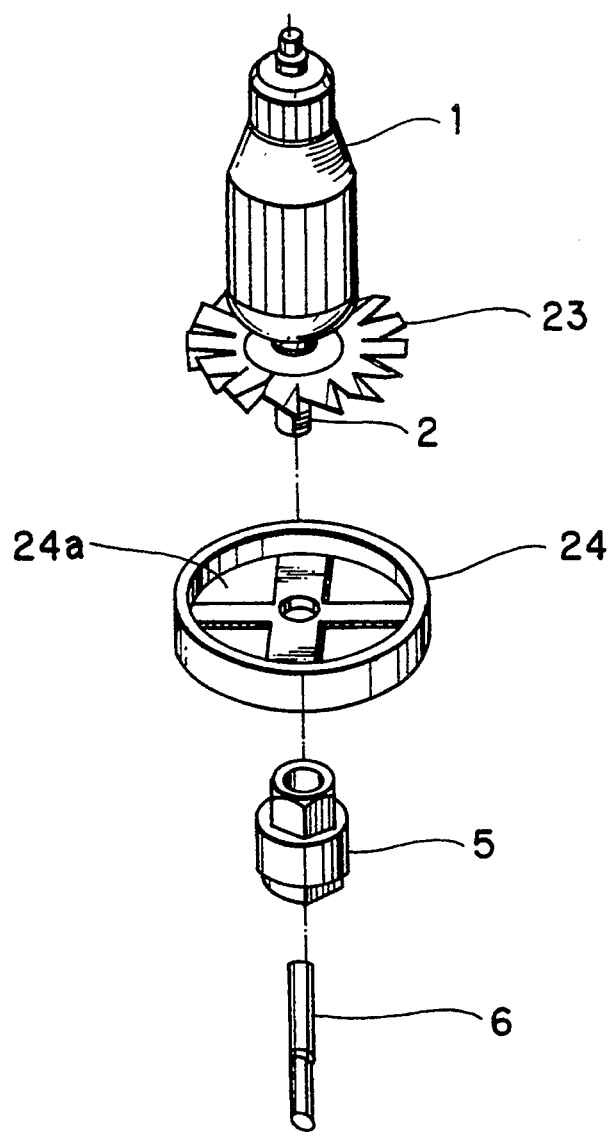
FIG. 8 is an exploded perspective view showing an essential portion of an electric router according to a third embodiment of this invention.

FIG. 8 shows a cooling fan 23 of a router according to a third preferred embodiment of the present invention. In the foregoing embodiments, the weight and the cooling fan are integrally provided. However, in the third preferred embodiment, a weight 24 is provided to the cooling fan 23 as a separate component. The weight 24 is formed with four sector openings 24a so as to allow air-flow produced by the cooling fan 23 to easily pass therethrough. By providing the weight 24 as a separate component, it can also easily be provided to a conventional electric routers, thereby providing the beneficial effects of the present invention to conventional electric routers.

Figure 1:
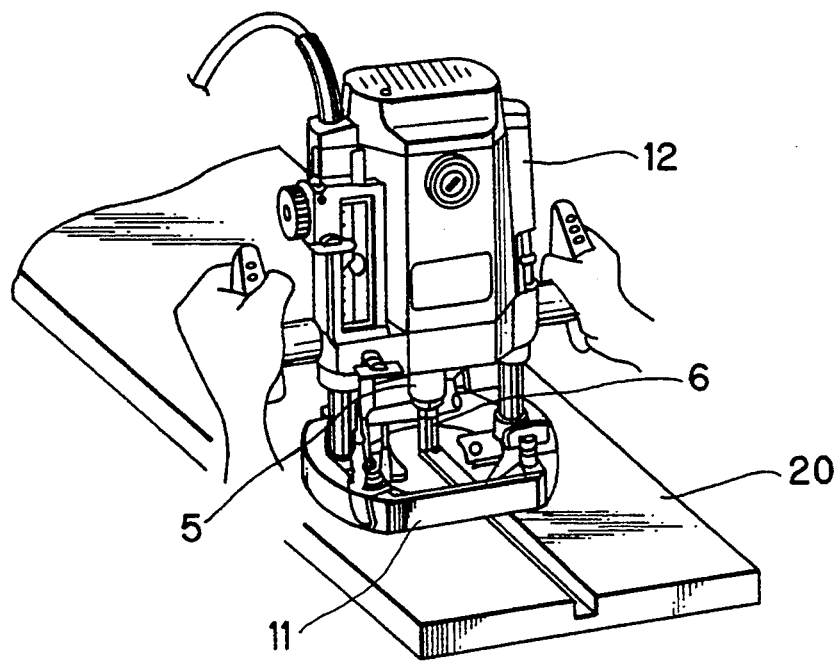
FIG. 1 is a perspective view showing a conventional electric router.
Figure 2:
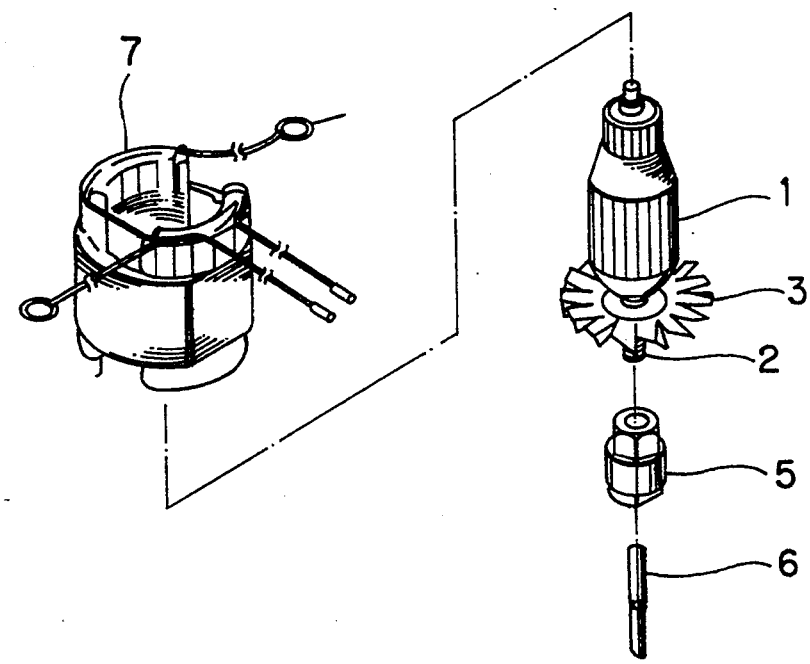
FIG. 2 is an exploded perspective view showing a motor, a cooling fan, a chuck and a cutting bit according to the conventional electric router.
Figure 9:
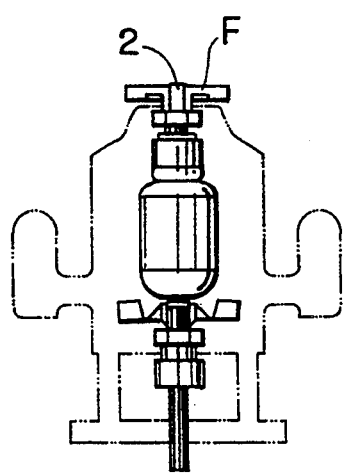
FIG. 9 is a schematic illustration for description of experiments.
Figure 10:
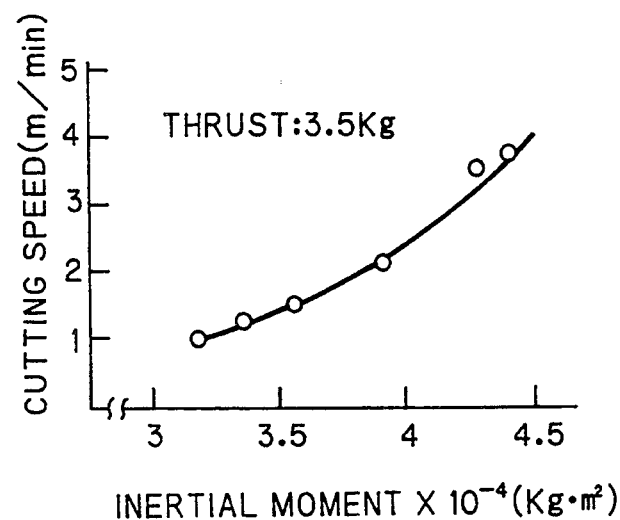
FIG. 10 is a graphical representation showing the relationship between the inertial moment and cutting speed.

Next, the relationship between the intensity of inertial moment and cutting speed will be described. As shown in FIG. 9, a flywheel F was mounted to the armature shaft 2 protruding from the router body. Various kinds of flywheels each having mass different from one another were prepared, and one of the flywheels was selectively mounted to the armature shaft 2 to investigate change in cutting speed dependent on the mass. Load on the electric router pressed against the workpiece 20 (FIG. 1), that is, the thrust, was set at 3.5 Kg. The same motor was used in each test, and test results are shown in FIG. 10. As can be clearly seen in FIG. 10, even if the same motor is used, the larger the inertial momentum, the higher the cutting speed.

Conclusion falls that by increasing the inertial moment of the cooling fan thereby increasing the combined inertial momentum of the rotary components of the router, i.e., a combination of the armature 1, the motor shaft 2, the cooling fan, and the chuck 5, the cutting efficiency of the router can be increased.

Next, tests were performed to determine effective ratio of the inertial momentum of the cooling fan to that of the entire rotary components of the router for obtaining sufficient cutting speed. The size of the motor was determined by thickness of lamination of the stator core. The thickness of the lamination was not limitlessly subdivided but set at a normal, for example, every 5 mm. Subsequently, for example, a motor one rank above a 40 mm lamination thickness motor with a 91 mm outer diameter stator has a stator core with 45 mm lamination thickness. As described above, the objective of the present invention is to increase the cutting efficiency of the router without increasing the size of the motor, thereby providing a lightweight, compact, and inexpensive electric router. Therefore, providing a router having a motor with a 40 mm lamination thickness with the cutting efficiency of a motor with a 45 mm lamination thickness would attain this objective.

Figure 11:
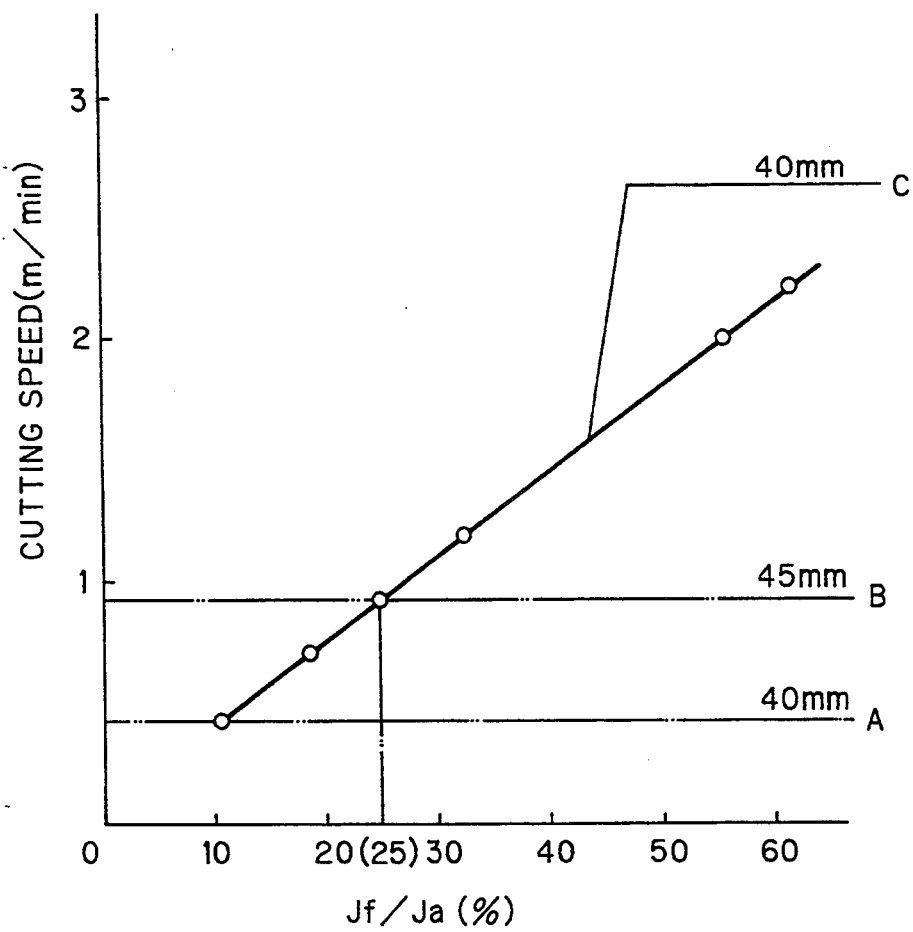
FIG. 11 is a graphical representation showing the relationship between the cutting speed and the ratio of inertial moment of the cooling fan to that of an entire rotating segment of the router.

FIG. 11 is a graph showing the relationship between the cutting speed and ratio of the inertial moment (Jf) of the cooling fan to the inertial moment (Ja) of the entire rotary components of the router. Further, Lines A and B represent the cutting speeds of routers with conventional cooling fans 3. The routers represented by lines A and B have motors with 40 mm and 45 mm lamination thicknesses, respectively. Line C represents the cutting speed of a router having a flywheel portion in the cooling fan. The motor in the router associated with the Line C had a 40 mm lamination thickness.

As shown in the graph, when ratio of Jf/Ja is ¼, the cutting speed is the same as that for a motor with a 45 mm lamination thickness. Therefore, making the inertial moment of the cooling fan ¼ or more that of the entire rotary components is sufficient.

By the above-described invention, the cutting efficiency of a router can be improved by simply increasing the inertial moment of the cooling fan. Since the cooling fan is an indispensable component, and since the cooling fan has the largest diameter among rotary components, the inertial moment could be easily increased by increasing the inertial moment of the cooling fan. As a result, a lightweight, compact, inexpensive electric router with sufficient cutting efficiency could be obtained. Consequently, even if a cutting bit having two cutting edges is employed in the router, stabilized cutting operation results because of the increased rotation power of the motor shaft.

Although the present invention has been described with reference to specific embodiments thereof, it will be apparent to those skilled in the art that various changes and modifications may be made therein without departing from the spirit of the invention.

What is claimed is:

1. A portable electric router for forming a chamfered portion or a groove portion in a workpiece, the router including a drive motor having a stator, an armature and a motor shaft; a cooling fan provided to the motor shaft and rotatable together with the motor shaft, the cooling fan being provided with a plurality of fan blades; and a chuck engageable with the motor shaft for clamping a cutting bit; and the improvement comprising: the cooling fan having a flywheel portion for increasing an inertial moment of the motor shaft.

2. The router as claimed in claim 1, wherein the cooling fan is an axial-flow fan, and the fan blades have outer edge portions, and wherein the flywheel portion comprises a first annular ring integrally connected to the outer edge portions of the fan blades.

3. The router as claimed in claim 2, wherein the fan blade and the first annular ring are formed integrally of a metal.

4. The router as claimed in claim 2, wherein the fan blade and the first annular ring are formed integrally of a synthetic resin, and wherein the flywheel portion further comprises a second annular ring formed of a metal fixed to the first annular ring.

5. The router as claimed in claim 1, wherein the cooling fan is a radial-flow fan having a fan body, and wherein the flywheel portion comprises an annular disc shaped member fixed to the fan body.

6. The router as claimed in claim 1, wherein the flywheel portion comprises a flywheel member fixer to the motor shaft and provided separate from the cooling fan, the flywheel member being formed with openings to allow air to pass therethrough.

7. The router as claimed in claim 1, wherein the inertial moment of the cooling fan is ¼ or more a combined inertial moment of the armature, the motor shaft, the cooling fan, and the chuck.

8. The router as claimed in claim 7, wherein the cooling fan is an axial-flow fan, and the fan blades have outer edge portions, and wherein the flywheel portion comprises a first annular ring integrally connected to the outer edge portions of the fan blades.

9. The router as claimed in claim 8, wherein the fan blades and the first annular ring are formed integrally of a metal.

10. The router as claimed in claim 8, wherein the fan blades and the first annular ring are formed integrally of a synthetic resin, and wherein the flywheel portion further comprises a second annular ring formed of a metal fixed to the first annular ring.

11. The router as claimed in claim 7, wherein the cooling fan is a radial-flow fan having a fan body, and wherein the flywheel portion comprises an annular disc shaped member fixed to the fan body.

12. The router as claimed in claim 7, wherein the flywheel portion comprises a flywheel member fixed to the motor shaft and provided separate from the cooling fan, the flywheel member being formed with openings to allow air to pass therethrough.

* * * * *